3,129,727
METALLIC PIPE LINED WITH GLASS SUBJECT TO SUBSTANTIALLY NO COMPRESSIVE STRESS AND PROCESS FOR THE MANUFACTURE THEREOF
Shoichiro Tanaka, Sumiyoshi-ku, Osaka City, Japan, assignor to Sanyo Tokushu Seiko Kabushiki Kaisha, Himeji City, Japan, a corporation
Filed May 19, 1960, Ser. No. 30,161
Claims priority, application Japan June 18, 1959
4 Claims. (Cl. 138—143)

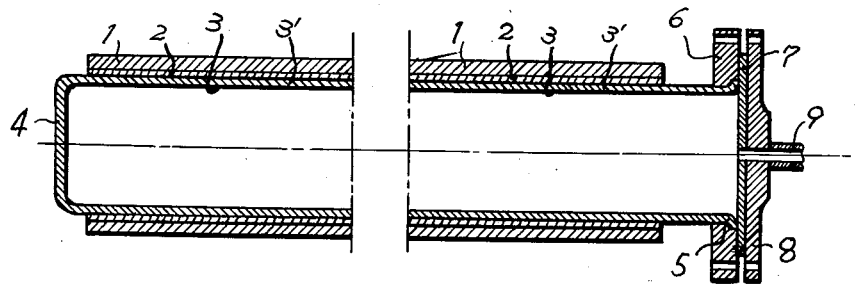
FIG.1.
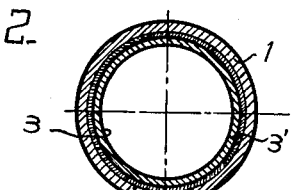
FIG.2.
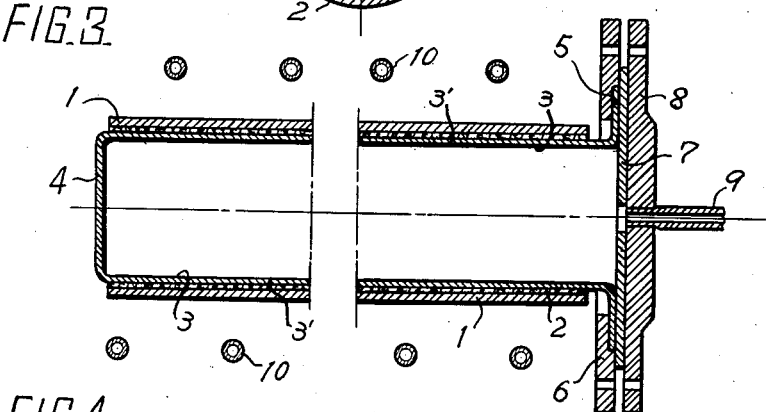
FIG.3.
FIG.4.
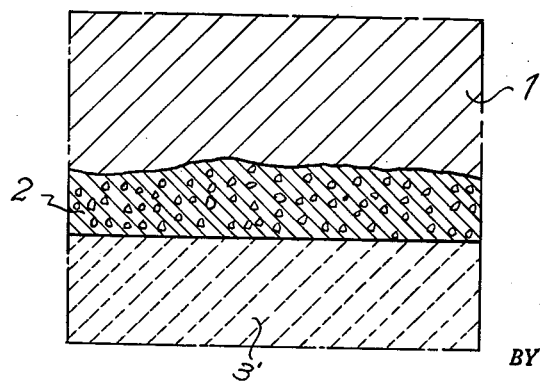
INVENTOR.
BY United States Patent Office 3,129,727
Patented Apr. 21, 1964

The present invention relates to a metallic pipe lined with glass subject to substantially no compressive stress and the process for the manufacture thereof and more particularly to a metallic pipe whose thin glass lining layer is subject to substantially no compressive stress caused by the difference in contraction due to heat or impact occurring between the outer metallic pipe and the glass layer lined on the inner surface of the outer metallic pipe and the process for the manufacture thereof.

Metallic pipes having their inner wall surface lined with a glass layer are well known. In such metallic pipes, when the glass layer lining is thin, the compressive stress imposed on the glass layer lining by the difference in contractions due to heat or impact between the glass layer lining and the outer metal pipe, increases inversely proportional to the thickness of the glass layer. For this reason, stresses will occur in the glass layer, tending to form wrinkles in the lining so as to peel the glass layer from the inner wall surface of the outer metal pipe, or the stresses might cause the glass layer to crack through a light impact. To overcome the above noted disadvantages, the use of reinforced glass has been proposed. However, there is a limit to the thickness of the glass layer; glass-lined steel pipes having linings of reinforced glass require glass layers of considerable thickness. This is a disadvantage in that its heat conductivity becomes greatly reduced.

Furthermore, an enamel substance has been interposed between the glass lining and the inner surface of the metal pipe for joining the glass lining to the metal pipe so that no leakage will occur. Since enamel is usually a mixture of metal oxide powder and glass powder, its fusing point cannot be made lower than the glass liner used. Since the enamel is simply for preventing leakage, it is impossible to avoid the setting up of compressive stresses in the glass pipe when fusing the enamel nor to obtain a thin tubular glass lining which possesses a good heat conductivity and is hard to crack.

The present invention proposes for the above reason the process of making metallic pipes having a glass lining, said lining being as thin as possible and having no compressive stresses imposed on the glass lining whereby excess strains are avoided due to deflection between the glass lining and the metallic pipe since the glass lining deflects with the outer metallic pipe and at the same time avoids the defect of interfering with its thermal conductivity when used for heat exchangers and the like.

For accomplishing the above mentioned objects according to this invention, a heat resistant, inorganic buffer layer is interposed between the outer metallic pipe and the glass layer, said heat resistant, inorganic buffer layer including compositions such as boron oxide or lead oxide, each having a fusion temperature below that of the glass layer and the metallic pipe and permeating the glass layer at its softening temperature or in the softened state to form a eutectic or fused mixture, said glass layer, buffer layer and metallic pipe being then pressed into one body.

Thus, according to the present invention, a glass lining is tightly adhered to the inner surface of a metallic pipe through a buffer layer without substantial compressive stress. In addition, even when the thickness of the glass pipe wall is very thin, for instance, around 1.0 mm., no wrinkling nor peeling will occur. Consequently, the glass lining fits the outer metallic pipe and both move as one body having a high impact strength as well as a high bending strength, wherein no cracks nor peeling will occur in the glass lining either from bending or from abrupt changes in temperature. The glass-lined pipe of the present invention has a high thermal conductivity and is corrosion resistant for use in the chemical industry.

Furthermore, for accomplishing the above object, according to this invention, an inorganic, heat resistant buffer layer having a lower fusion temperature as compared with that of the outer metallic pipe and the glass layer is interposed between the glass layer and the inner surface of the metallic pipe and minute gas bubbles are formed in the buffer layer.

Thus, in the present invention, the structure of the buffer layer comprises, as a principal constituent, a heat resistant, inorganic substance, such as lead oxide or boron oxide having a relatively low fusion temperature, and, as an additional constituent, metal salts or metal oxides, such as metallic carbonate or metallic peroxide, generating bubbles of several microns by thermal decomposition or heating. As a result, the minute bubbles provide a high buffering action. Therefore, the heating temperature of the outer metallic pipe can be easily controlled. Accordingly, no pressure is imparted to the glass layer to cause stress therein, and in addition, a high resistance to external impact forces results. Thus, there is an advantage in that breakage or peeling off can be prevented.

In the following description, the present invention will be described with respect to the embodiments illustrated in the accompanying drawings, in which:

FIG. 1 is a longitudinal sectional view schematically illustrating the suitable means for carrying out this invention;

FIG. 2 is a sectional end view of a glass-lined pipe manufactured by the means illustrated in FIG. 1;

FIG. 3 is a longitudinal sectional view showing another embodiment for carrying out the process of this invention; and FIG. 4 is an enlarged side elevational view of a glass lined pipe manufactured by the means shown in FIGS. 1 and 3.

The present invention consists in the parts and combinations to be hereinafter set forth and claimed, with the understanding that the several necessary elements, comprising the invention, may be varied in construction, proportions and arrangement, without departing from the spirit and scope of the appended claims. Similar symbols represent similar parts throughout the accompanying drawings.

Referring to FIGS. 1 and 2 illustrating one embodiment of this invention by way of example, 1 is a metallic pipe, such as a steel pipe, to be internally lined with a glass layer 3', the inner face of said pipe being previously finished in a course surface by blasting with emery powder. A buffer layer 2 is formed between the glass pipe lining layer 3' and said outer metallic pipe 1. The glass lining layer 3' is formed by heating glass pipe 3, said glass pipe being closed by fusion at one end 4, while the other end has a flange portion 5.

The buffer layer 2 is formed as an inorganic, heat resisting buffer layer, that is, said buffer layer being constructed in such a manner that 0.5 part sodium oxide, 0.5 part lead oxide pulverized to about 300 mesh, 2.0 parts silicon dioxide and 1.0 part boron oxide are mixed to form homogeneous fine powders, which are then dissolved in water to form a slurry material; thereafter said slurry material is pasted on the inner surface of the metallic pipe to a thickness ranging from 0.1 to 0.4 mm.

The mixed slurry material melts at about 660° C. The fusion temperature of the metallic pipe internally lined with a glass layer is chosen particularly and preferably higher than the fusion temperature of the buffer layer. The flange portion 5 is hermetically closed by interposing a rubber gasket 7 between clamping flanges 6 and 8. The rubber gasket and clamping flanges are penetrated by a feed pipe 9, said feed pipe being opened at one end in the glass pipe 3 and being connected to a source of high pressure gas (not illustrated).

The structure of buffer layer 2 according to this invention is not limited by the foregoing one shown by way of example. The buffer layer 2 may have a lower fusion point as compared with the glass pipe 3 forming glass layer 3'; accordingly, when the buffer layer is heated, it turns into a molten state and penetrates the glass layer 3 thereby forming a eutectic thin layer 3' to be described more fully hereinafter.

The metallic pipe according to this invention is manufactured in the following manner:

First, the outer steel pipe 1 is uniformly heated throughout its entire length by suitable heating means, then interposed glass pipe 3 is heated to at least 30° C. above its softening temperature through buffer layer 2, and high pressure gas is introduced into the glass from feed pipe 9 after glass pipe 3 has been softened, thus pressing the whole peripheral surface of glass pipe 3 outwardly to adhere to the inner wall of metallic pipe 1, the heating of the outer metallic pipe is stopped and thereafter the introduction of high pressure gas is also stopped after the metallic pipe has been cooled to a considerable extent, excess glass portions are then cut off at the end of the metallic pipe after further cooling.

The heat resisting buffer layer 2 thus fabricated has not only a lower fusion point as compared with either the metallic pipe 1 or glass pipe 3, but the material of the layer 2 includes such components as readily form a eutectic or fused mixture, for instance, boron oxide or lead oxide. The buffer layer melts before the inner or outer surfaces of the glass pipe melts, particularly, before the inner surface of the glass pipe melts; accordingly, the buffer layer penetrates a portion of the glass layer to constitute a eutectic or fused mixture whereby the joining portion of the buffer layer and the glass pipe constitutes a thin layer component of eutectic or fused mixture. The outer surface of the glass pipe is adhered tightly to the inner surface of the metallic pipe through the buffer layer.

Since the buffer layer 2 has a low fusion point, when the metallic pipe 1 has shrunk sufficiently after being cooled, the buffer layer between the metallic pipe and the glass pipe remains hot and in the softened state. As a result, the buffer layer prevents the glass pipe from being stressed due to the contraction of the metallic pipe and simultaneously, after cooling, the glass pipe 3 adheres to the metallic pipe in substantially one body.

FIGURES 3 and 4 show another embodiment of the present invention by way of example. In this embodiment, numerous bubbles are formed within the material of the heat resistant buffer layer.

Referring to FIGS. 3 and 4, 1 is a metallic pipe which is to be lined with a glass layer 3'. The inner surface of the metallic pipe is roughened by emery sand blasting. A buffer layer 2 is formed between a thin glass pipe layer 3 having one end 4 fused closed, and the inner surface of the metallic pipe, the open end of the glass pipe 3 being provided with a flange portion 5 closely adhered to a rubber gasket 7, said flange portion 5 and rubber gasket 7 being interposed between clamping flanges 6 and 8, respectively, which are suitably secured by adequate means. A feed pipe 9 penetrates the rubber gasket 7 and clamping flange 8 for introducing high pressure gas into glass pipe 3.

The above-mentioned buffer layer 2 is formed by using a mixture consisting principally of a heat resistant inorganic substance having a relatively low fusion point such as lead oxide or boron oxide and an appropriate quantity of metal carbonate or metal peroxide whereby bubbles are generated in the mixture upon heating.

For instance, a fine pulverized powder of a mixture of more than 300 mesh, consisting of 0.5 part by weight of lead oxide (PbO), 2.0 parts by weight of silicon dioxide ($SiO_2$) and 1.0 part by weight of boron trioxide ($B_2O_3$) mixed with 0.1 to 0.5 part by weight of metal salts or metal oxides generating a considerable quantity of gas due to thermal decomposition, such as barium peroxide ($BaO_2$), barium carbonate ($BaCO_3$), bismuth trioxide ($Bi_2O_3$), calcium peroxide ($CaO_2$) or cobalt trioxide ($CO_2O_3$) is converted to a slurry with the addition of water and the resulting slurry is applied to the internal surface of metallic pipe 1 to a thickness ranging from 0.1 to 0.4 mm.; glass pipe 3 is inserted into the metallic pipe after the painted layer has dried, all of which are then heated in a high frequency induction furnace 10 until the glass pipe 3 has attained its softening point; then high pressure gas is introduced into the glass pipe 3 through feed pipe 9 connected to a high pressure gas source (not illustrated) thereby joining the glass pipe to the inner surface of the metallic pipe.

Thus, the buffer layer 2 assumes a molten state by heating and simultaneously the bubble generating metallic salt or oxide present in the layer is subjected to thermal decomposition which results in a foaming action or the generation of numberless fine bubbles of several microns which causes the inner surface of the metallic pipe to adhere to the outer surface of glass pipe 3 in buffering condition whereby the heating temperature of the outer metallic pipe can be easily controlled and no excess pressure is exerted on the glass pipe 3 to cause any amount of stress therein and a high buffering action is obtained from the foam or bubbles thereby protecting the glass liner from any damage or peeling off by external impact forces.

In this connection, the results of tests conducted on a metallic pipe having an outside diameter of 48.9 mm. and an inside diameter of 39.2 mm., and having a glass layer lining of 1.0 mm. thickness as well as a buffer layer of 0.15 thickness are shown as follows:

(1) *Impact falling test.*—A 100 mm. steel pipe having a sectional dimension as described above was dropped from a height of 4 meters on a concrete floor; no irregularity was observed in the glass layer lining. On the contrary, an ordinary glass lined pipe cracked in the glass layer lining and a part of the glass layer was found peeled off the steel pipe. However, no irregularity was found when the ordinary glass lined pipe was dropped from a height of 2 meters; hence, the critical safety value was 2 meters. Accordingly, the strength of the improved glass lined pipe of this invention may be estimated to be approximately double that of the ordinary glass lined pipe.

(2) *Impact ball drop test.*—A steel pipe having the same dimensions as noted above was placed on the ground and a steel ball of 200 gm. in weight was dropped from a height of 2 meters. There was no irregularity found in the glass layer lining. On the contrary, in the case of the ordinary glass lined pipe, the glass layer lining cracked when subjected to the same test. The critical safety value was found to be 1 meter; hence, the strength of the improved glass lined pipe of this invention may be estimated to be approximately twice that of the ordinary glass lined pipe.

(3) *Bending test.*—A steel pipe having a length of 600 mm. and having the same cross sectional dimensions as noted above was placed on two supports having a 400 mm. span and was loaded at the center by a 750 kg. weight; there was no irregularity observed in the glass layer lining. On the contrary, the critical safety value of the ordinary glass lined pipe was found to be 500 kg.

(4) *Thermal conductivity test.*—The heat conductivity of the improved glass lined pipe was found to be approximately 90% of the thermal conductivity of the outer metallic pipe. On the contrary, in the ordinary glass lined pipe, the heat conductivity was found to be approximately 75% of the thermal conductivity of the outer metallic pipe because the thickness of the glass layer lining was not as thin as the glass layer lining of the present invention.

(5) *High temperature impact test.*—The improved glass lined pipe of the present invention was quenched from a high temperature of 360° C. in cold water having a temperature of 1° C. No irregularity was observed in the glass layer lining. On the contrary, the limit of the temperature difference in quenching for an ordinary glass lined pipe was found to be 260° C.

While I have shown and described the preferred embodiments of my invention, I wish it to be understood that I do not confine myself to the precise details of construction herein set forth by way of illustration, as it is apparent that many changes and variations may be made therein by those skilled in the art without departing from the spirit of the invention or exceeding the scope of the appended claims.

What I claim:

1. A glass lined metallic pipe of the character described comprising a metallic pipe, a glass pipe positioned interiorly of said metallic pipe in coaxial relationship therewith and an inorganic heat resistant buffer layer interposed between the inner and outer surfaces of the metallic and glass pipes, respectively, the metallic pipe, buffer layer, and glass pipe being fused to each other at said surfaces whereby a relatively low compressive stress is imparted to the glass pipe by the metal pipe, the buffer layer having a lower fusing point than that of the metallic and glass pipes and including an oxide selected from the group consisting of boron oxide and lead oxide.

2. A glass lined metallic pipe comprising a metallic pipe, a glass pipe positioned interiorly of said metallic pipe in coaxial relationship therewith and an inorganic heat resistant buffer layer interposed between the inner and outer surfaces of said metallic and glass pipes, respectively, the metallic pipe, buffer layer, and glass pipe being closely adhered to each other whereby a relatively low compressive stress is imparted to the glass pipe by the metal pipe, and said buffer layer having a plurality of minute bubbles therein.

3. A glass lined metallic pipe according to claim 2 wherein the buffer layer includes barium carbonate.

4. A glass lined metallic pipe according to claim 2 wherein the buffer layer includes a metal oxide from the group consisting of barium peroxide, bismuth trioxide, calcium peroxide and cobalt trioxide.

References Cited in the file of this patent

UNITED STATES PATENTS

| | | |
|---|---|---|
| 430,041 | Crowder et al. | June 10, 1890 |
| 476,648 | Husselbee | June 6, 1892 |
| 667,646 | Bergier | Feb. 5, 1901 |
| 2,006,226 | Yaxley | June 25, 1935 |
| 2,405,075 | Vollrath | July 30, 1946 |
| 2,464,487 | Chappell et al. | Mar. 15, 1949 |
| 2,606,574 | Lefebvre | Aug. 12, 1952 |
| 2,753,893 | Brown | July 10, 1956 |

FOREIGN PATENTS

| | | |
|---|---|---|
| 1,183,341 | France | Jan. 26, 1959 |
| 14,356 | Great Britain | Oct. 30, 1884 |